(12) United States Patent
Kaczmarek

(10) Patent No.: US 12,527,527 B2
(45) Date of Patent: Jan. 20, 2026

(54) GRAPHICAL REPRESENTATION OF CHANGE IN PATIENT STATE

(71) Applicant: KONINKLIJKE PHILIPS N.V., Eindhoven (NL)

(72) Inventor: Piotr Kaczmarek, Milton, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 330 days.

(21) Appl. No.: 18/036,194

(22) PCT Filed: Nov. 16, 2021

(86) PCT No.: PCT/EP2021/081766
§ 371 (c)(1),
(2) Date: May 10, 2023

(87) PCT Pub. No.: WO2022/106382
PCT Pub. Date: May 27, 2022

(65) Prior Publication Data
US 2023/0404489 A1      Dec. 21, 2023

Related U.S. Application Data

(60) Provisional application No. 63/116,234, filed on Nov. 20, 2020.

(30) Foreign Application Priority Data

Dec. 16, 2020  (EP) .................................... 20214428

(51) Int. Cl.
*A61B 5/00* (2006.01)

(52) U.S. Cl.
CPC ............ *A61B 5/7275* (2013.01); *A61B 5/681* (2013.01); *A61B 5/743* (2013.01); *A61B 5/7435* (2013.01)

(58) Field of Classification Search
CPC ....... A61B 5/7275; A61B 5/681; A61B 5/743; A61B 5/7435
See application file for complete search history.

(56) References Cited

U.S. PATENT DOCUMENTS

D822,708 S        7/2018   Ghosh
2005/0096540 A1*  5/2005   Ooshima .................. G16Z 99/00
                                                        600/437

(Continued)

FOREIGN PATENT DOCUMENTS

JP      2007313019 A      12/2007
JP      2016529955 A       9/2016
JP      2016202286 A      12/2016

OTHER PUBLICATIONS

International Search Report Dated Feb. 14, 2022 For International Appln No. PCT/EP2021/081766 Filed Nov. 16, 2021.

(Continued)

*Primary Examiner* — Daniel Samwel

(57) ABSTRACT

Methods and apparatus disclosed herein relate to graphical representation of change in patient state. In various embodiments, one or more measured physiological parameters of a patient may be analyzed, which includes determining a rate of change in one or more of the measured physiological parameters over time. Based on the analysis, a graphical user interface (GUI) may be rendered. The graphical user interface may include a comet-shaped graphical element that conveys the rate of change in the one or more of the physiological parameters over time. For example, the comet-shaped graphical element may include a tail that is sized or shaped to convey the direction and the rate of change.

16 Claims, 11 Drawing Sheets

(56) References Cited

U.S. PATENT DOCUMENTS

| | | | |
|---|---|---|---|
| 2012/0215085 A1 | 8/2012 | Werner | |
| 2013/0083029 A1 | 4/2013 | Vadlamudi | |
| 2015/0051462 A1* | 2/2015 | Olsen | A61B 5/743 |
| | | | 600/323 |
| 2015/0186602 A1 | 7/2015 | Pipke | |
| 2017/0124273 A1 | 5/2017 | Huang | |
| 2017/0147776 A1* | 5/2017 | Moorman | G16H 50/30 |
| 2018/0087937 A1 | 3/2018 | Al-Ali | |
| 2020/0375457 A1* | 12/2020 | Van Tassel | H04W 76/14 |

OTHER PUBLICATIONS

Cain, B. (2007) A Review of the Mental Workload Literature. RTO-TR-HFM 121: 1-34.
Massey D., Chaboyer W., Anderson V. (2017) What factors influence ward nurses' recognition of and response to patient deterioration? An integrative review of the literature. Nursing open 4: 6-23.
Michard, F, Gan, T.J., Bellomo, R. (2019) Protecting ward patients: the case for continuous monitoring. ICU Management & Practice Intensive care—Emergency Medicine—Anaesthesiology 19: 60-62.
Michard, F. (2016) Hemodynamic monitoring in the era of digital health. Annals of intensive care 6: 15.
Michard, F. (2020) The Future of Haemodynamic Monitoring: From Planet Mars to Resource-Limited Countries. ICU Management & Practice 19: 198-201.
Hemmerling, T.M. (2011) Decision Support Systems in Anesthesia, Emergency Medicine and Intensive Care Medicine; Jao PC, editor. https://www.intechopen.com/chapters/18705.
Cernea, Daniel et al: "An Interactive Visualization for Tabbed Browing Behaviour Analysis", In Computer Vision, Imaging and Computer Graphics—Theory and Applications, vol. 458 of Communications in Computer and Information Science (CCIS), pp. 69-84, Springer, 2014.
Farkas, J. (2016) Why we fail at hemodynamics: The flaw of averages & the swan's curse. PulmCrit EmCrit. https://emcrit.org/pulmcrit/hemodynamics-swan-curse/.
Pinsky, M.R. (2003) Hemodynamic monitoring in the intensive care unit. Clinics in chest medicine 24: 549-560.
Gurushanthaiah, K., Weinger, M.B., Englund C.E. (1995) Visual display format affects the ability of anesthesiologists to detect acute physiologic changes. A laboratory study employing a clinical display simulator. Anesthesiology 83: 1184-1193.
Sanderson P.M., Watson, M.O. Russell W.J. (2005) Advanced patient monitoring displays: tools for continuous informing. Anesthesia and analgesia 101: 161-168, table of contents.

* cited by examiner

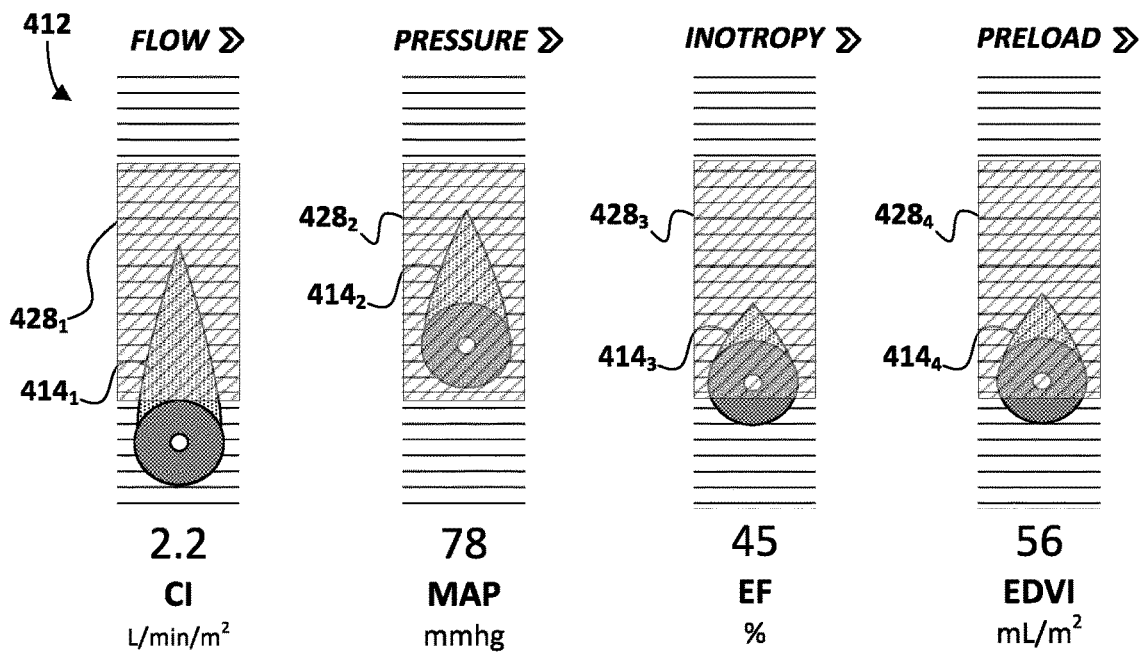
Fig. 4A
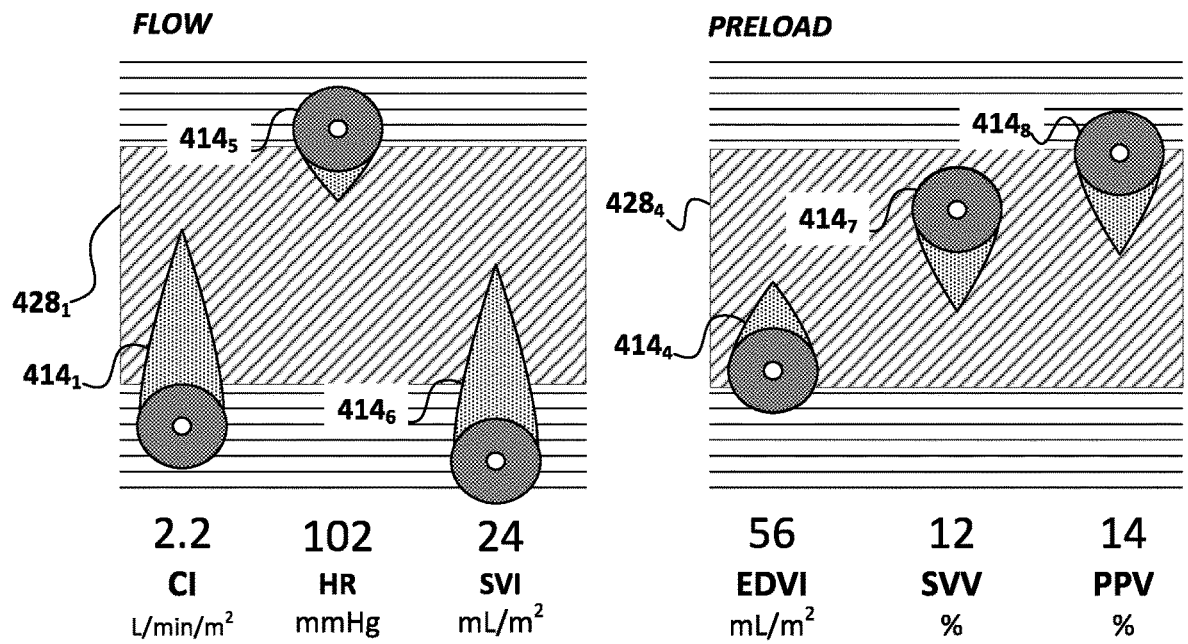
Fig. 4B
Fig. 4C

GRAPHICAL REPRESENTATION OF CHANGE IN PATIENT STATE

CROSS-REFERENCE TO PRIOR APPLICATIONS

This application is the U.S. National Phase application under 35 U.S.C. § 371 of International Application No. PCT/EP2021/081766, filed on Nov. 16, 2021, which claims the benefit of European Application No. 20214428.3 filed on Dec. 16, 2020 and U.S. Provisional Application No. 63/116,234 filed Nov. 20, 2020. These applications are hereby incorporated by reference herein.

FIELD OF THE INVENTION

Various embodiments described herein are directed generally to health care. More particularly, but not exclusively, various methods and apparatus disclosed herein relate to graphical representation of change in patient state.

BACKGROUND OF THE INVENTION

Large numbers of physiological parameters may be measured for a patient, especially if they are in a heighted state of monitoring, such as being in an intensive care unit (ICU). Presenting these measured physiological parameters to health care personnel such as doctors and nurses can be challenging. Presenting too many measured physiological parameters can be overwhelming, while presenting too few may not sufficiently inform the health care personnel of the patient's condition, particularly a change in the patient's condition.

In the patient monitoring context, many existing patient monitors are devoted to representing numerical displays and waveforms. This information is sometimes accompanied by annotations such as arrows denoting direction of change. However, due to a variety of factors, such as a lack of sufficient explanation of timeframes and a lack of clarity with regard to acuteness of events, these annotations are usually disregarded by healthcare personnel. Instead, a patient monitor is primarily used for closely tracking the measured physiological parameters representing the patient's current state and checking for data quality issues such as sensor detachment.

To ascertain trends in a patient's state over time, medical personnel often consult electronic medical records (EMR) systems and/or patient data management systems (PDSM). However, given the large amount of data points typically present in a patient's EMR(s), the medical personnel's cognitive processing ability may be quickly overwhelmed. Moreover, the time that medical personnel interact with EMR systems is time away from the patient. Consequently, in a typical workflow, medical personnel tend to rely on the real-time information provided by the patient monitor to make clinical decisions. Similar challenges occur in the diagnostics context. The large amount of measured physiological parameters theoretically enable more confident and precise diagnosis. But, at the same time, the avalanche of data creates cognitive overload.

US 2018/087937 A1 discloses a physiological monitor gauge panel that defines parameters to display on a physiological monitor via corresponding gauges. Gauge faces depict a range of parameter values for each of the parameters. An indicator designates a position on each gauge face corresponding to the current parameter value within the range of parameter values. The indicated position on each of the gauges is at the mid-point of each of the gauge faces when each of the parameters is at a nominal value.

US 2015/186602 A1 discloses a system and method for priority-based management of patient health for a patient population. Efficient management of patient health of a population of patients, such as chronically ill patients living at home and monitored with remote continuous wearable or implantable physiology telemetry, is provided by means of a computer application for rendering a prioritized list of patients sortable according to a number of distinct criteria.

SUMMARY OF THE INVENTION

The present disclosure is directed to methods and apparatus for graphical representation of change in patient state. For example, in various embodiments, a graphical user interface (GUI) that is rendered on a display may include one or more graphical elements that convey, in a manner that is intuitive and quickly-digestible, changes of one or more measured physiological parameters of a patient. In various embodiments, these graphical elements may have various spatial dimensions that are selected based on rates of changes in underlying measured physiological parameters. For example, a graphical element rendered using techniques described herein may take the form of comet-shaped graphical element with a tail that is sized or shaped to convey the rate of change of an underlying measured physiological parameter. For example, a length of the tail may convey a rate of change of the underlying measured physiological parameter, with a longer tail conveying a greater rate of change and a shorter tail conveying a lesser rate of change.

In some embodiments, a spatial portion or "zone" of the GUI may be visually annotated, e.g., with shading, pattern fill, color, etc., to convey a desired/normal range of a given measured physiological parameter. One or more comet-shaped graphical elements may be rendered in spatial relation with the visually-annotated zone of the GUI, e.g., by overlaying it, overlapping with it, etc., in order to convey how the given measured physiological parameter is trending relative to the desired range. In some embodiments, the GUI may include various tick marks to indicate reference values of physiological parameters. These tick marks may be present within and/or outside of the visually-annotated spatial zone.

In some implementations, multiple comet-shaped graphical elements may be presented simultaneously by the GUI. In some such embodiments, the underlying data representing multiple measured physiological parameters may be normalized relative to each other. Consequently, when the multiple comet-shaped graphical elements are rendered adjacent each other, health care personnel may quickly deduce a patient's changing state from multiple vantage points, and/or may be able to determine which physiological parameters are contributing to changes in other physiological parameters overtime.

In some embodiments, multiple comet-shaped graphical elements may be rendered at once in a circular fashion, extending at radial orientations from a center point. For example, numeric scales on which these graphical elements are rendered may extend inward and/or outward from the center point at angles relative to each other, e.g., positioned at regular arcs around the center point. The measured physiological parameters underlying these graphical elements may be selected in order that the multiple comet-shaped graphical elements collectively convey a trend towards or away from some condition or medical event. In some such embodiments, and similar to the visual annotation described previously, an annular spatial zone of the GUI that at least partially encircles the center point may be visually annotated (e.g., with shading, color, pattern fill, etc.) to convey a normalized desired range of each measured physiological parameter of the plurality of measured physiological parameters. As mentioned previously, each comet-shaped graphical element may be rendered in spatial relation with the annular spatial zone of the graphical user interface to convey how the given measured physiological parameter is trending relative to the desired range.

In various embodiments, to render an ensemble of comet-shaped graphical elements to convey information about a particular medical event or condition, a set of physiological parameters may be selected that collectively convey and/or individually contribute to the condition or event. As one example, physiological parameters that may collectively convey and/or contribute to a patient's oxygenation state may include, for instance, partial pressure of carbon dioxide ($PaCO_2$), fraction of inspired oxygen ($FiO_2$), positive end-expiratory pressure (Peep), alveolar-arterial gradient (A-a), temperature, Oxygen extraction ratio ($O_2ER$), blood pH, partial pressure of oxygen ($PaO_2$), $PaO_2/FiO_2$ Ratio (Pa/Fi), arterial blood oxygen saturation ($SaO_2$), global oxygen delivery ($DO_2$), arterial oxygen content ($CaO_2$), cardiac output (CO), and/or hemoglobin (Hgb). Other combinations of these and other parameters to monitor oxygenation are possible.

As another example, a set of physiological parameters may be selected that collectively convey and/or individually contribute to a determination of whether a patent is experiencing, has experienced, or likely will experience, septic shock. These parameters may include, for instance, venous oxygen saturation ($SvO_2$), mean arterial pressure (MAP), systemic vascular resistance (SVR), urine output (UO), $PaO_2$, $O_2ER$, stroke volume variation (SVV), temperature, respiratory rate (RR), and CO. Other combinations of these and other parameters to monitor for septic shock are possible.

As yet another example, a set of physiological parameters may be selected that collectively convey and/or individually contribute to a determination of whether a patent is experiencing, has experienced, or likely will experience, a pulmonary embolism. These parameters may include, for instance, $SaO_2$, MAP, SVR, pH, CO, heartrate (HR), pulmonary vascular resistance (PVR) temperature, RR, and/or D-dimer.

Embodiments described herein give rise to various technical advantages. The comet-shaped graphical elements allow medical personnel to easily ascertain/understand trends in a patient's state over time, without having to consult EMRs and/or PDSM. Moreover, given their compact nature, multiple comet-shaped graphical elements can be fit onto a small area, such as a smart watch display, a patient monitor (which typically have small displays), and/or a small region of a nurse station's monitor (to allow information for other patients to also be displayed at the same time), and yet a large amount of information is still conveyed.

Generally, in one aspect, a method may be implemented using one or more processors, and may include: analyzing one or more measured physiological parameters of a patient, which includes determining a rate of change in one or more of the measured physiological parameters over time; and based on the analyzing, causing a graphical user interface to be rendered, wherein the graphical user interface includes a comet-shaped graphical element that conveys the rate of change in the one or more of the measured physiological parameters over time, wherein the comet-shaped graphical element includes a tail that is sized or shaped to convey the rate of change.

In various embodiments, a spatial zone of the graphical user interface is visually annotated to convey a desired range of a given measured physiological parameter of the one or more measured physiological parameters, wherein the comet-shaped graphical element is rendered in spatial relation with the spatial zone of the graphical user interface to convey how the given measured physiological parameter is trending relative to the desired range.

In various embodiments, the analyzing includes analyzing a plurality of measured physiological parameters of the patient; and the graphical user interface includes a plurality of comet-shaped graphical elements, each comet-shaped graphical element conveying current value as well as a rate and direction of change in a respective one of the measured plurality of physiological parameters of the patient. In various embodiments, the plurality of comet-shaped graphical elements are oriented radially about a center point. In various embodiments, the graphical user interface is rendered on relatively small display, such as a smart watch display, a wearable patient monitoring device display (e.g., worn on the patient's wrist like a watch), or other patient monitors having relatively small displays. In various embodiments, an annular spatial zone of the graphical user interface that at least partially encircles the center point is visually annotated to convey a normalized desired range of each measured physiological parameter of the plurality of measured physiological parameters, wherein each comet-shaped graphical element is rendered in spatial relation with the visually-annotated annular zone of the graphical user interface to convey how the corresponding measured physiological parameter is trending relative to the desired range.

In various embodiments, the physiological parameter may be a first physiological parameter, the comet-shaped graphical element is operable to cause one or more additional comet-shaped graphical elements to be rendered as part of the graphical user interface, and each of the one or more additional comet-shaped graphical elements conveys a rate of change of a corresponding additional physiological parameter that contributes to the rate of change of the first physiological parameter.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating various principles of the embodiments described herein.

FIGS. 4A, 4B, and 4C depict example graphical user interfaces configured with selected aspects of the present disclosure.

DETAILED DESCRIPTION OF EMBODIMENTS

Large numbers of physiological parameters may be measured for a patient, especially if they are in a heighted state of monitoring, such as being in an intensive care unit (ICU). Mental processing of these measured physiological parameters by health care personnel such as doctors and nurses can strain their cognitive abilities. For example, the numerical displays and waveforms presented by many patient monitors may not be effective in conveying a change in a patient's state over time. To ascertain trends in a patient's state over time, medical personnel often consult electronic medical records (EMR) systems and/or patient data management systems (PDSM). However, given the large amount of data points typically present in a patient's EMR(s), the medical personnel's cognitive processing ability may be quickly overwhelmed. Moreover, the time that medical personnel interact with EMR systems is time away from the patient. In view of the foregoing, various embodiments and implementations of the present disclosure are directed to improved graphical representation of change in patient state.

Figure 1:
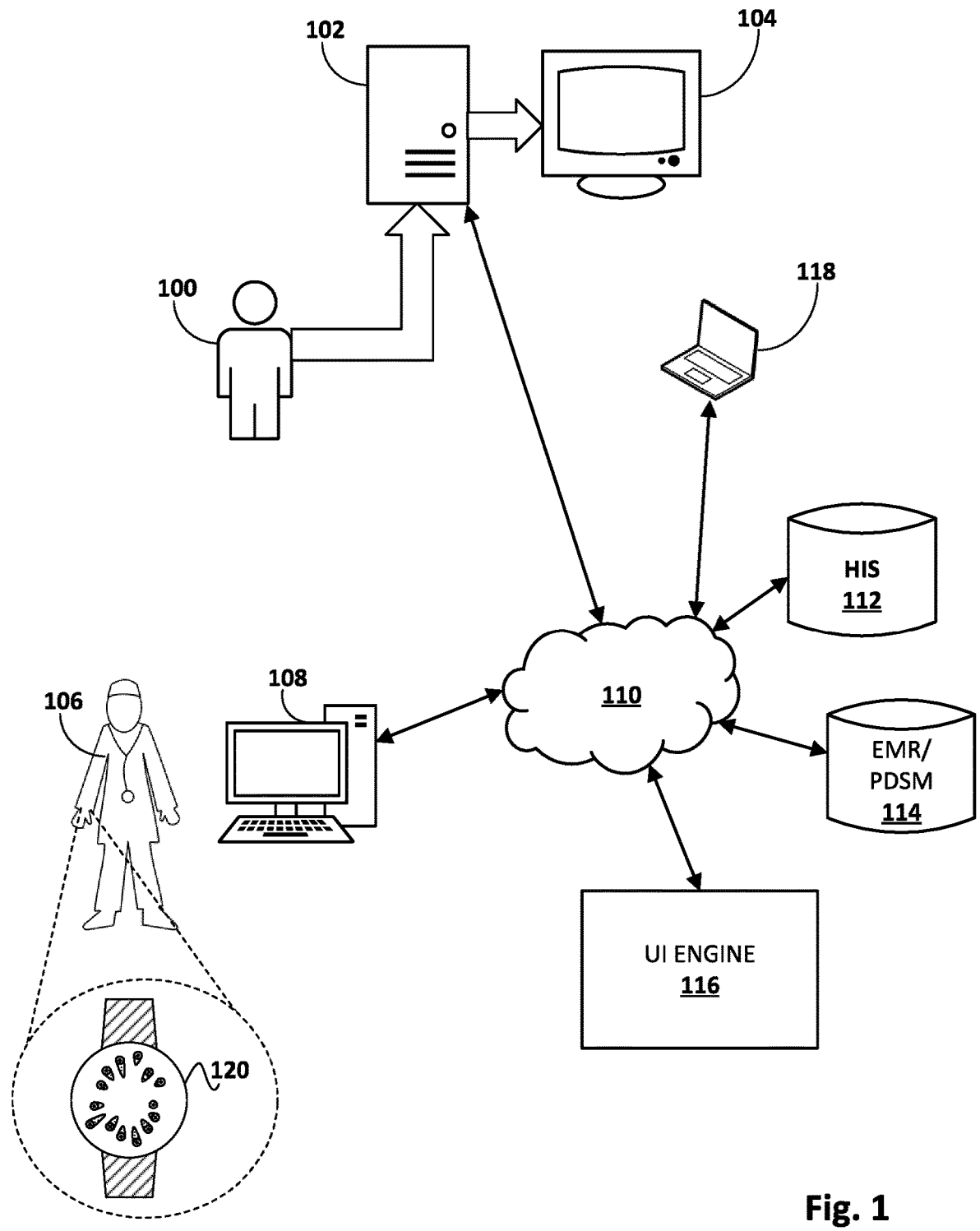
FIG. 1 illustrates an example environment in which selected aspects of the present disclosure may be practiced.

FIG. 1 depicts an example environment with various components that may practice selected aspects of the present disclosure. A patient 100 may have various physiological parameters measured, e.g., by various types of probes, electrodes, laboratory tests, swabs, etc. Those measured physiological parameters may be provided to a local computing device 102 that is operably coupled with a patient monitor 104. In some embodiments, patient monitor 104 may be a standalone computing device with onboard logic such as processor(s) and memory, in which case computing device 102 may be omitted. Patient monitor 104 may display a graphical user interface ("GUI", not depicted in FIG. 1) that is configured with selected aspects of the present disclosure to convey a change in state of one or more measured physiological parameters over time.

Health care personnel 106 such as doctors, nurses, clinicians, etc., may read patient monitor 104 directly, and/or may operate various types of client computing devices 108 to view GUIs rendered with selected aspects of the present disclosure. Computing device 108 (or other computing devices mentioned herein) may take various forms, such as one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided.

Various components depicted in FIG. 1, such as computing device 102, computing device 108, and/or patient monitor 104, may be in network communication with each other over one or more computer networks 110. One or more computer networks 110 may include wired and/or wireless local area and/or wide area networks (e.g., the Internet). Various computer networking technologies may be implemented to facilitate communication between the various components, such as Wi-Fi, cellular, Ethernet, fiber optic, etc.

Various information systems may be provided that are accessible to obtain various data points relevant to the present disclosure. For example, a hospital information system (HIS) 112 and/or an EMR/PDSM system 114 may receive and/or maintain, e.g., as part of EMRs for patients, measured physiological parameters. A user interface (UI) engine 116 may be configured to practice selected aspects of the present disclosure in order to cause various display devices, such as patient monitor 104, computing device 108, or other devices such as a laptop computer 118 controlled by patient 100 (e.g., in their home, or in their relative's home) and/or smart watch 120 worn by health care personnel 106 (or by a patient), to render GUIs configured with selected aspects of the present disclosure. For example, UI engine 116 may obtain measured physiological parameters from other information systems (e.g., 112, 114), from laboratories, and/or from equipment being used to monitor physiological parameter(s) of patient 100, analyze these data points, and based on the analysis, render graphical elements that convey rate(s) of change of various physiological parameters of patient 100. While depicted separately from HIS 112 and EMR/PDSM 114 in FIG. 1, in other embodiments, UI engine 116 may be integral with either of these other information systems. In some embodiments, a patient may also wear a smart watch and/or wearable patient monitor (not depicted) that includes a display on which GUIs configured with aspects of the present disclosure may be rendered.

Figure 2A:
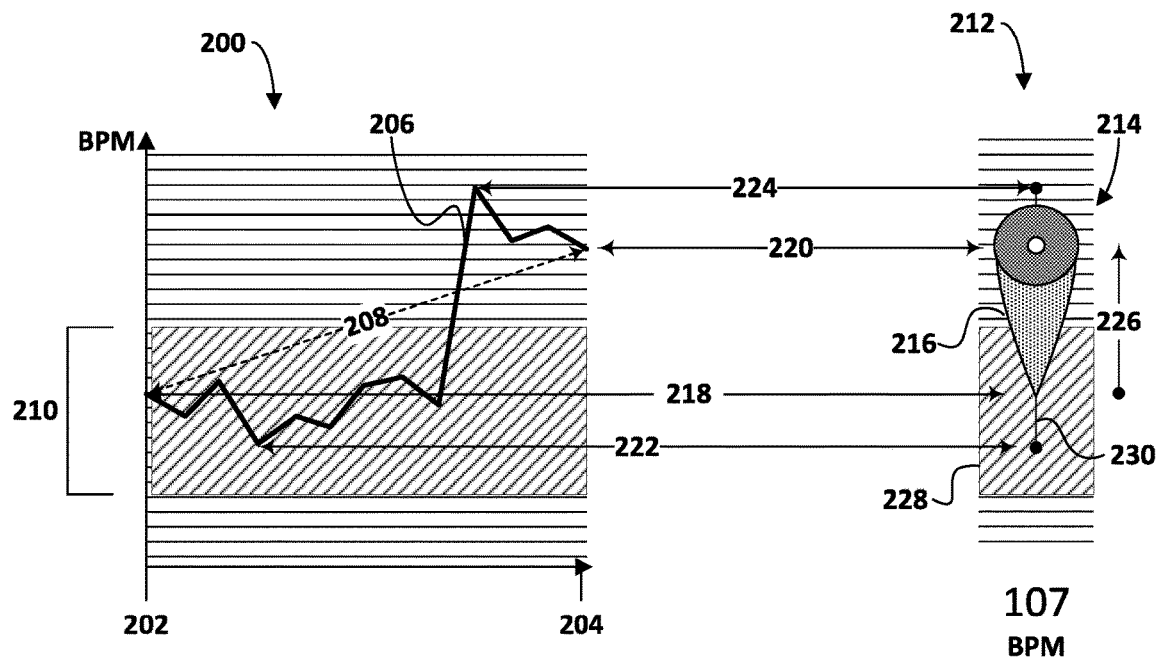
FIGS. 2A, 2B, 2C, 2D, and 2E depict example graphical user interfaces configured with selected aspects of the present disclosure.

FIG. 2A demonstrates how data conveyed by a conventional GUI 200 at left may be conveyed differently with a GUI 212 at right that is configured with selected aspects of the present disclosure. In FIG. 2A, a chart has a horizontal axis that begins at a start time 202 and extends to an end time 204. In some embodiments, start time 202 may be a selected time interval prior to the present, and end time 204 may be the present moment. In other embodiments, start time 202 may be a time corresponding to administration of some treatment to patient 100, and end time 204 may be a selected time interval after, such as up to the present moment, or some amount of time during which patient 100 is expected to respond to the administered treatment.

The vertical axis at left in FIG. 2A represents beats per minute (BPM). A line graph 206 in FIG. 2A represents BPM of patient 100 measured during the time interval 202-204. More generally, the GUIs 200 and 212 of FIG. 2A are meant to convey heartrate. A trend line 208 is also depicted as connecting the start and ending BPM values at left in FIG. 2A.

Accordingly, as part of GUI 212 at right, a comet-shaped graphical element 214 is rendered to convey a rate of change of the heartrate of patient 100. Unlike with GUI 200, in GUI 212, the time interval (horizontal axis) is not included explicitly. Instead, a tail 216 of comet-shaped graphical element 214 is sized and shaped to convey the rate of change of the heartrate of patient 100.

Various points represented in GUI 200 are also represented in GUI 212, albeit in different manners. For example, line 218 shows how a measured BPM at the start of time interval 202-204 translates across the GUIs to a bottom tip of the tail 216. Line 220 shows how an ending BPM for the time interval 202-204 translates across the GUIs to a center of a circular "head" of comet-shaped graphical element 214. The ending measured BPM (107) is also conveyed textually at bottom of GUI 212. Line 222 shows how a minimum measured BPM measured during time interval 202-204 translates across the GUIs to a minimum point of a range line 230. Similarly, line 224 shows how a maximum measured BPM measured during time interval 202-204 translates across the GUIs to a maximum point of range line 230.

Also included in GUI 200 is a visually-annotated zone 210 of GUI 200 that conveys a desired heartrate range. A spatial zone 228 of GUI 212 is similarly annotated based on this desired heartrate range. Comet-shaped graphical element 214 is rendered in spatial relation with (e.g., overlaying, underlying, overlapping, etc.) visually-annotated zone 228 of GUI 212 to convey how the heartrate of patient 100 is trending relative to the desired range. GUI 212, including comet-shaped graphical element 214, provides health care personnel with a concise, succinct, compact, and intuitive way to ascertain the same information as they would from GUI 200, with less cognitive effort.

Comet-shaped graphical element 214 may be rendered in a variety of different ways depending on, among other things, user preferences, display space (or "real estate"), etc., various examples of which are depicted in FIGS. 2B-E. In various embodiments, these various visual configurations may be determined based on explicit user input, or may be selected automatically based on user preferences, contextual data such as screen size, measures of patient criticality, etc.

Figures 2B, 2C, 2D, 2E:
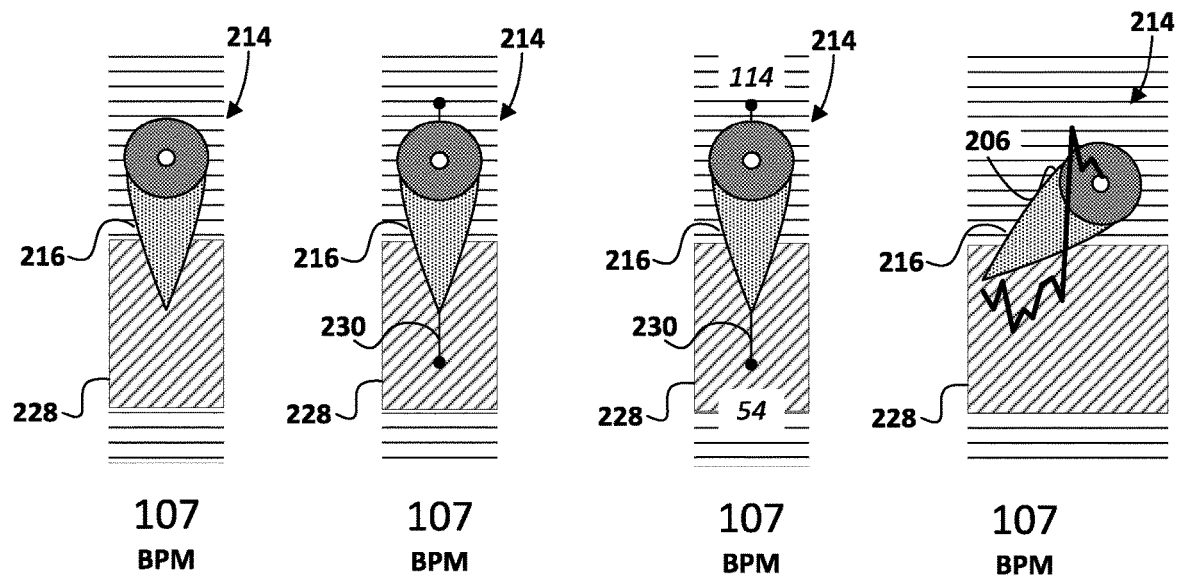

In FIG. 2B, comet-shaped graphical element 214 is rendered without range line 230. This may be sufficient in situations with short time horizons, measures with little fluctuation, or as a simple representation of change achieved via medical intervention. By contrast, in FIGS. 2C (and 2A), comet-shaped graphical element 214 is rendered with range line 230, which provides slightly more information (maximum and minimum measured values). In FIG. 2D, comet-shaped graphical element is rendered with range line 230 and with annotations of maximum (114) and minimum (54) BPM measurements, e.g., because medical personnel may desire additional explanation.

In FIG. 2E, comet-shaped graphical element 214 is rendered at a tilted angle relative to a vertical axis (not depicted). Also rendered overlaying comet-shaped graphical element 214 is line graph 206 that is based on the same data (BPM measurements). FIG. 2E may be particularly beneficial to teach new users how GUIs configured with selected aspects of the present disclosure (e.g., 212) convey the same data, albeit more succinctly and compactly, as GUIs they have worked with previously (e.g., 200).

In various embodiments, multiple graphical elements such as comet-shaped graphical elements 214 may be rendered at once, e.g., in spatial relation to each other in order to convey rates of change of multiple physiological parameters and/or of a condition to which those parameters contribute and/or are indicative of. However, various physiological parameters are expressed and/or quantified using vastly different units of measure. Accordingly, to make the whole set of multiple rendered graphical elements easier to understand, various normalization techniques may be applied to, for instance, align normal or desired ranges of otherwise heterogeneous physiological parameters. Thus, for instance, the visually-annotated zone 228 in FIGS. 2A-E can be aligned with corresponding annotated zones underlying other comet-shaped graphical elements that convey rates of change of other measured physiological parameters. Various examples will be provided in subsequent figures.

Figure 3A:
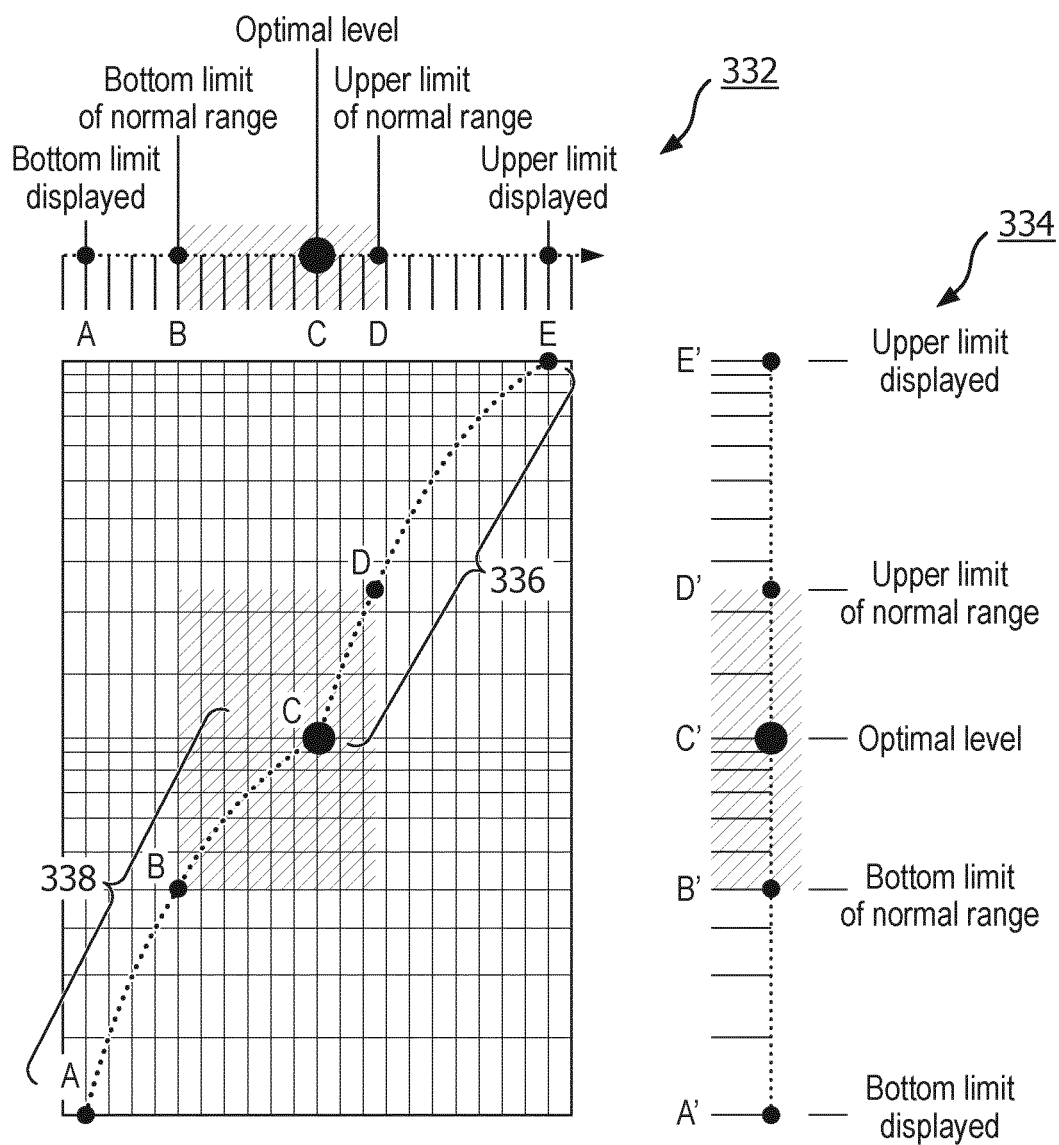
FIGS. 3A and 3B demonstrate one example of how multiple heterogeneous measured physiological parameters may be normalized relative to each other, in accordance with various embodiments.
Figure 3B:
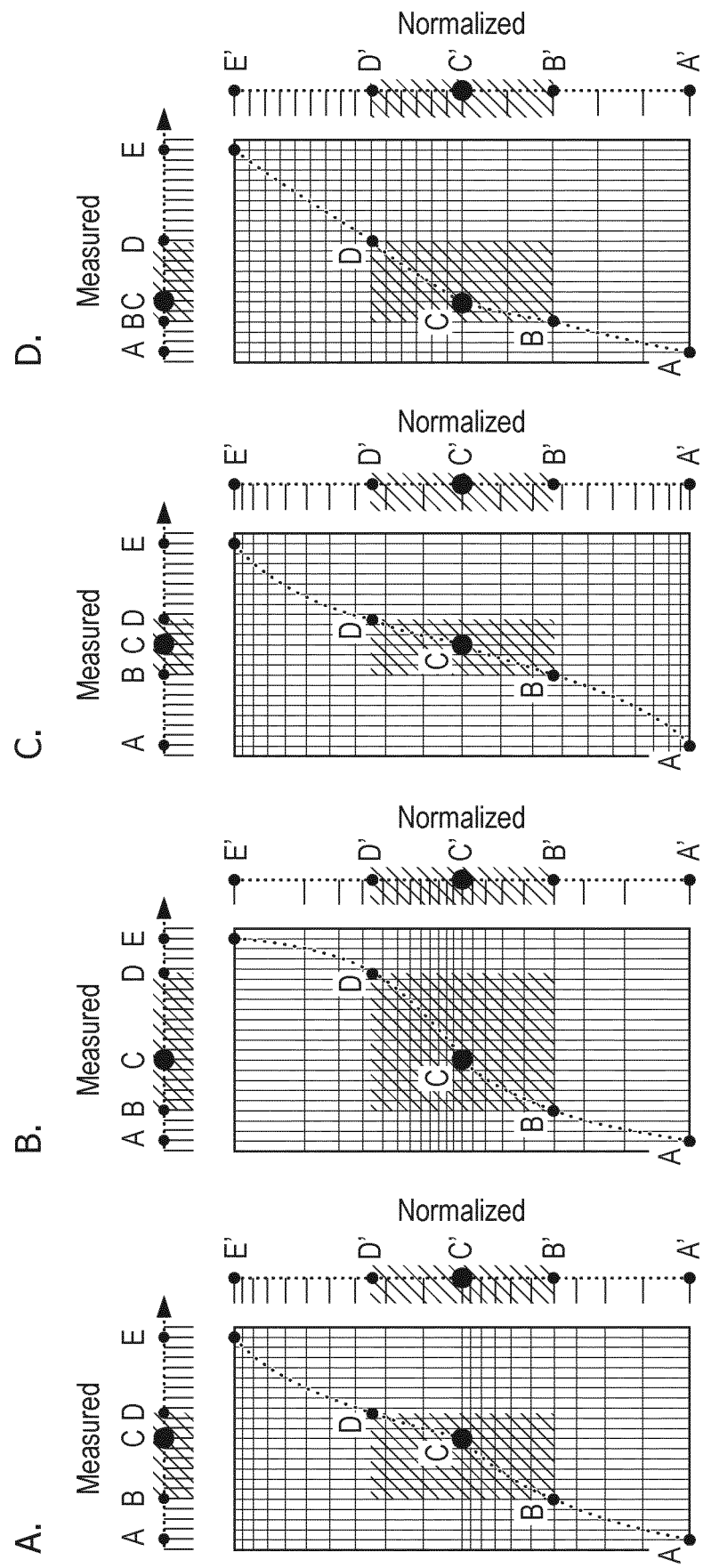

FIGS. 3A and 3B demonstrate one technique for normalizing across multiple heterogeneous physiological parameters to facilitate alignment of normal/desired ranges, and hence, spatial alignment of portions of GUIs that are visually annotated to show these ranges. Uniform display styles for different physiological parameters may be based on data normalization, e.g., converting linear progression of a scale 332 of the original data into a standardized display scale 334. In some embodiments, this conversion may rely on two three-points-fitted quadratic functions. One set 336 of three-points-fitted quadratic functions may include an optimal level (C), an upper limit of the normal range (D), and an upper extreme of the displayed range (E). The other set 338 of three-points-fitted quadratic functions may include a bottom display limit (A), a bottom limit of the normal range (B), and the aforementioned optimal level (C). Measured physiological parameters that fall outside the displayed range(s) may be shown as a minimum or maximum display level. As a consequence of this conversion, the uniform spacing of tick lines in the original scales 332 changes in the resulting vertical scale 334 into non-uniform progression of tick marks.

FIG. 3B depicts additional examples of how heterogeneous physiological parameters may be normalized using the technique described above. At top of each parameter graph is a scale of the originally-measured data with uniform progression, as indicated by the equally-spaced tick marks. These scales can be converted into uniform normalized scale representation as shown in the right of each physiological parameter. As a consequence of this conversion, the uniform spacing of tick lines in the top scales changes in the resulting vertical scales at right, into non-uniform progression of tick marks.

FIGS. 4A-C depict examples of a GUI 412 that may be rendered to convey rates of change of multiple physiological parameters at once. In FIG. 4A, GUI 412 includes a row of four graphical displays showing information about four different physiological categories: Flow (for which one underlying physiological parameter CI is displayed), Pressure (for which the physiological parameter MAP is displayed), Inotropy (for which the physiological parameter ejection fraction, or "EF", is displayed), and Preload (for which the physiological parameter end-diastolic volume index, or "EDVI", is displayed). Other physiological parameter categories such as afterload may also be presented but are omitted here for the sake of brevity. These physiological parameter categories are formed from clusters of related measured physiological parameters that have been normalized, e.g., using the techniques demonstrated in FIGS. 3A-B, so that four different visually-annotated zones $428_{1-4}$ representing normal ranges are visible and aligned, in spite of the heterogeneity of the underlying physiological parameters. Four comet-shaped graphical elements $414_{1-4}$ are also depicted, one for each physiological parameter/category.

In FIG. 4A, portions of comet-shaped graphical elements that are outside of visually-annotated zones $428_{1-4}$ are rendered more clearly than portions that are inside of visually annotated zones $428_{1-4}$. This may emphasize to medical personnel when particular physiological parameters are outside of normal ranges. As shown, the patient from which these physiological parameters were measured is experiencing a sharp decline in flow, a medium decline in pressure, and lesser declines in inotropy and preload. Partially highlighted 'head disks' ($414_3$, $414_4$) may be provided to alert the viewer about values close to breaching desired range.

In some implementations, a user may be able to interact with GUI 412 in order to dig into the underlying data further and/or to view other measured physiological parameters of each cluster of measured physiological parameters that may contribute to or otherwise evidence various medical conditions and/or states. For example, if a user were to click on, for instance, a title (FLOW) above the first comet-shaped graphical element $414_1$, the chevron to the right of the title, or in some cases, any portion of the underlying graphical display, the interface may expand to depict what's shown in FIG. 4B, which is the same physiological parameter category (Flow) but includes other related physiological parameters of the same cluster that are represented by additional comet-shaped graphical elements $414_5$ (heartrate) and $414_6$ stroke volume index (SVI). Similarly, if a user were to click on a title (PRELOAD) of the fourth comet-shaped graphical element $414_4$, the chevron to the right of the title, or in some cases, any portion of the underlying graphical display, the interface may expand to depict what's shown in FIG. 4C, which is the same physiological parameter category (Preload) but includes other related physiological parameters represented by additional comet-shaped graphical elements $414_7$ (SVV) and $414_5$ (Positive predictive value (PPV)).

Figure 5:
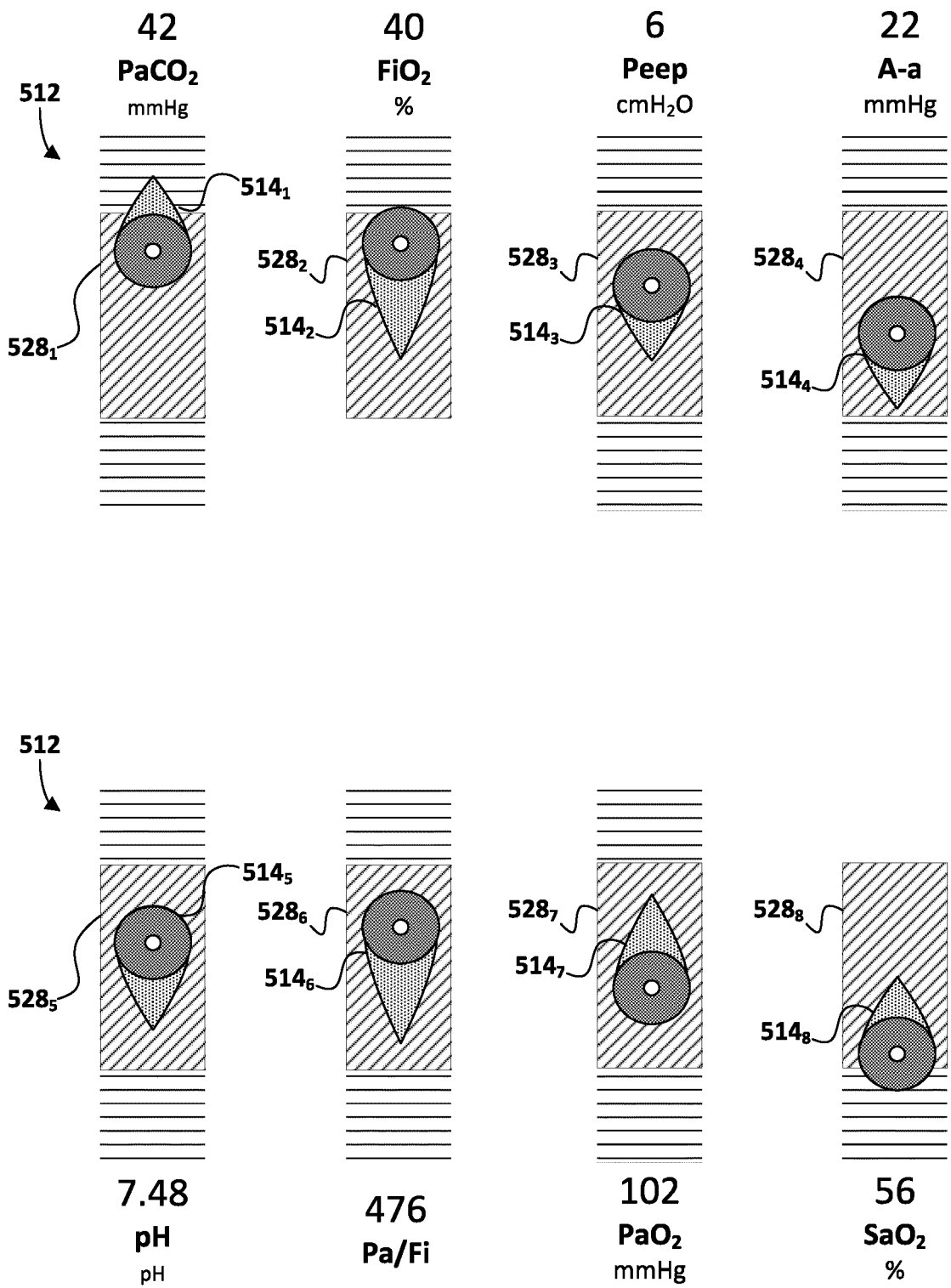
FIG. 5 depicts another graphical user interface configured with selected aspects of the present disclosure.

FIG. 5 depicts another variation of a GUI 512 that includes graphical displays for eight physiological parameters, organized into two rows. Thus, there are four comet-shaped graphical elements $514_{1-4}$ and four visually-annotated zones $528_{1-4}$ in the top row and four comet-shaped graphical elements $514_{5-8}$ and four visually-annotated zones $528_{5-8}$ in the bottom row. The top row may include measured physiological parameters that are too high or and trending in a direction towards too high. The bottom row may include measured physiological parameters that are too low or and trending in a direction towards too low. In various implementations, if a particular physiological parameter changes its trajectory, e.g., from being too high to being too low, it may shift between rows. In some embodiments, a GUI such as 512 may be used as an intermediate explanatory display for the logic used to construct the circular GUIs depicted in FIGS. 6-8.

Figure 6:
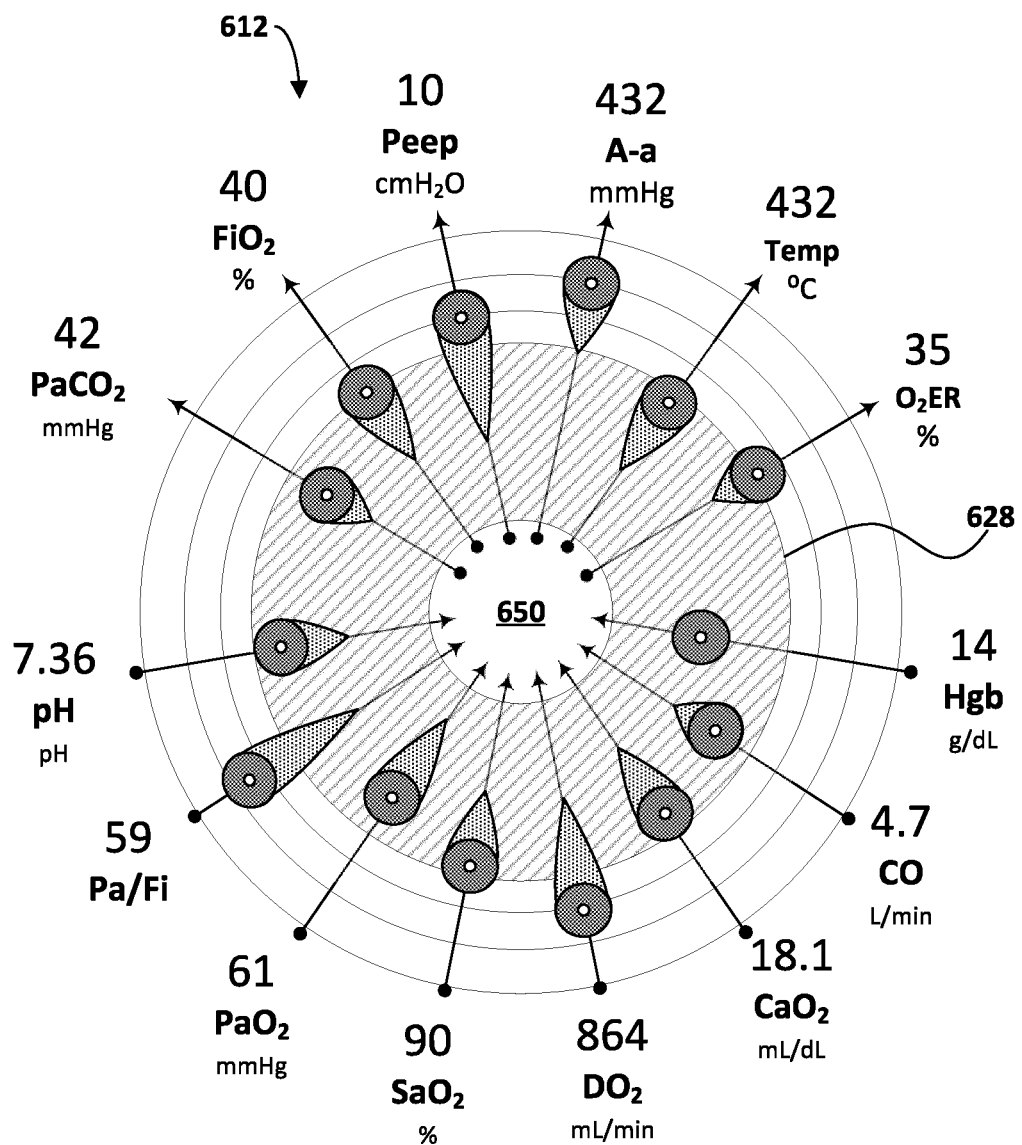
FIG. 6 depicts another graphical user interface configured with selected aspects of the present disclosure.

FIG. 6 depicts one example of a GUI 612 where a plurality (fourteen in this example) of comet-shaped graphical elements are oriented radially (e.g., in a "bullseye" pattern) about a center point 650. These measured physiological parameters may be indicative collectively of a patient's oxygenation state. For the sake of clarity, the individual comet-shaped graphical elements are not numbered. An annular spatial zone 628 of GUI that at least partially encircles center point 650 is visually annotated (e.g., with shading, color, pattern fill, etc.) to convey a normalized desired range of each measured physiological parameter of the plurality of measured physiological parameters. Each comet-shaped graphical element is rendered in spatial relation with the visually-annotated annular zone 628 of GUI 612 to convey how the given measured physiological parameter is trending relative to the desired range.

In FIG. 6, the top half of GUI 612 includes comet-shaped graphical elements representing physiological parameters that, in the patient's current condition, are too high and/or need to decrease. Similarly, the bottom half of GUI 612 includes comet-shaped graphical elements representing physiological parameters that, in the patient's current condition, are too low and/or need to increase. The underlying arrows represent numeric axes or scales for each physiological parameter that indicate a positive increase.

Figure 7:
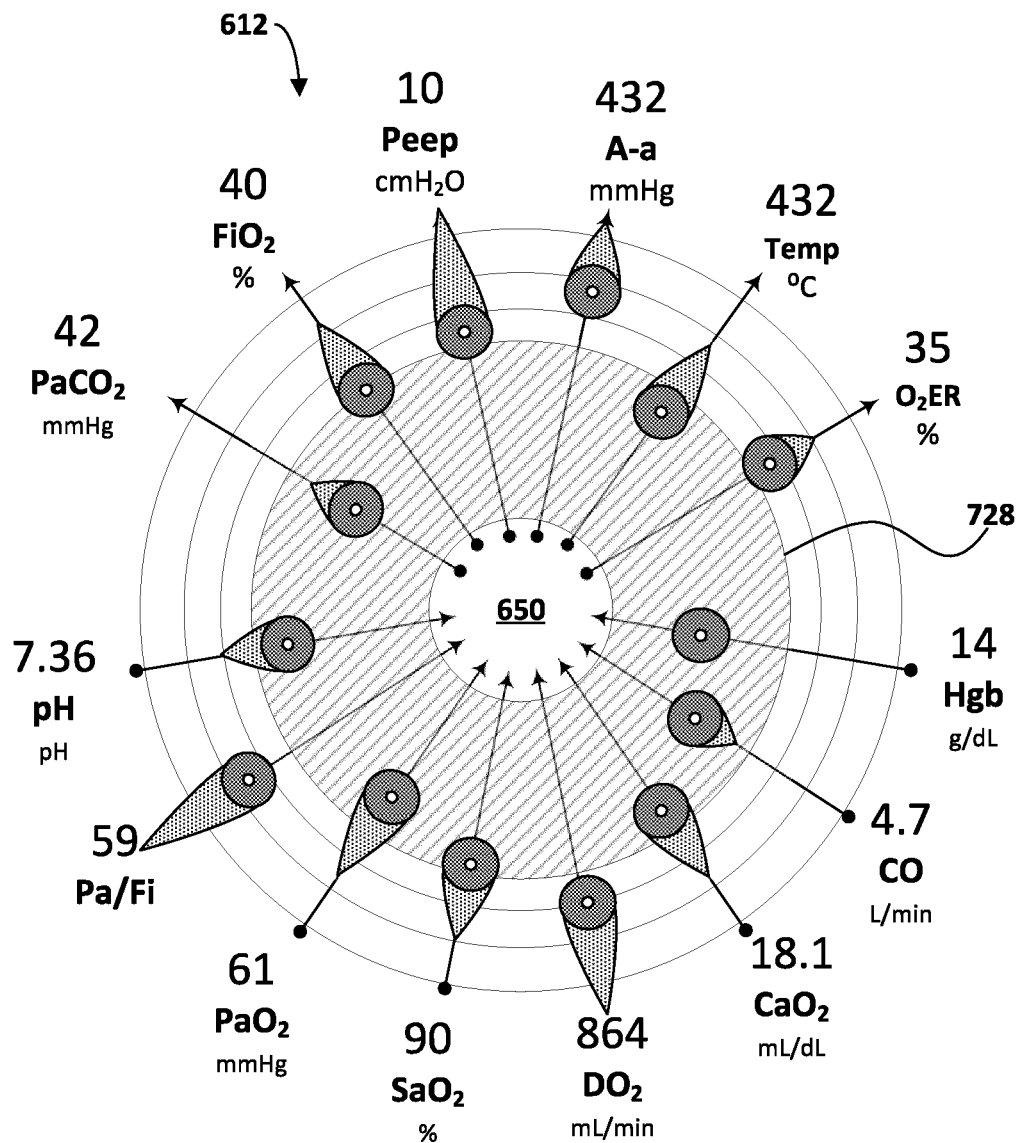
FIG. 7 depicts another graphical user interface configured with selected aspects of the present disclosure.

One advantage of the bullseye configuration of GUI 612 is that the direction of change of the patient's state is made evident. Inward motion of the comet-shaped graphical elements indicates patient improvement. Outward shift indicative patient deterioration. FIG. 7, when viewed in conjunction with FIG. 6, demonstrates one example of this advantage. In FIGS. 6 and 7, the exact same current physiological measurements (explicitly indicated at the ends of the radially-oriented/extending axes) are shown. However, in FIG. 6, the tails of the comet-shaped graphical elements indicate a general outward trend, and hence, deterioration of the patient's condition. By contrast, in FIG. 7, the tails of the comet-shaped graphical elements indicate a general inward trend, and hence, improvement of the patient's condition.

Another advantage of the bullseye configurations of FIGS. 6 and 7 is that they may fit on a circular display, such as a smart watch 120 worn by medical personnel 106 in FIG. 1, a wearable patient monitor worn by a patient, etc. Alternatively, multiple bullseye GUIs corresponding to physiological parameters measured from multiple patients may be rendered at once on a larger display, e.g., at a central nurse's station, on a display in a clinician's office, as part of a telehealth dashboard, etc.

Figure 8:
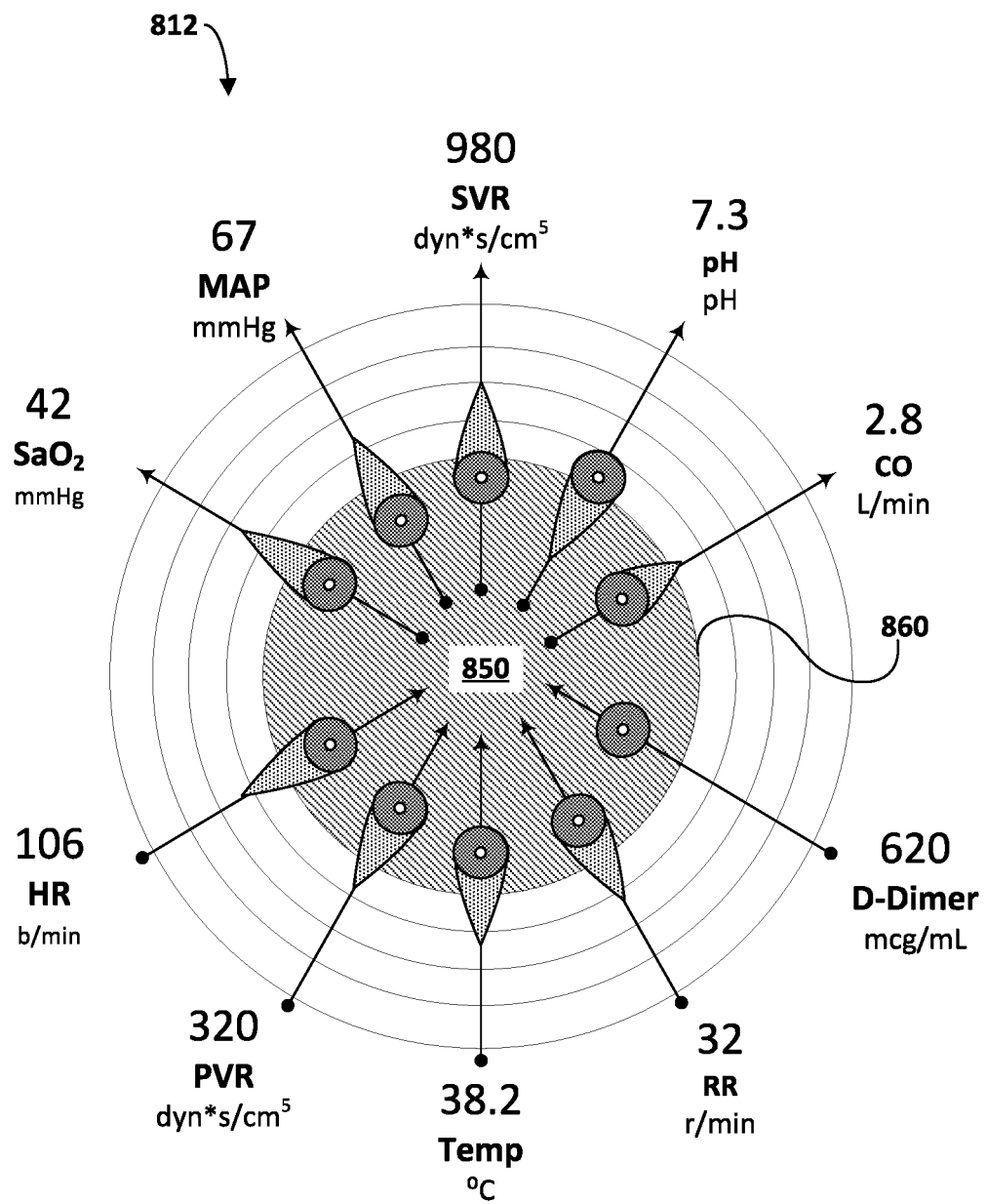
FIG. 8 depicts another graphical user interface configured with selected aspects of the present disclosure.

FIG. 8 depicts a GUI 812 that also includes a bullseye configuration of comet-shaped graphical elements extending radially from a center point 850. However, GUI 812 differs from GUI 612 in some ways. For example, GUI 812 includes a circular visually-annotated zone 860 that represents a range or threshold for diagnosing a condition, which in this example is a pulmonary embolism (but this is not meant to be limiting). If all or a portion of a comet-shaped graphical element is located within circular visually-annotated zone 860, the underlying measured physiological condition fulfills the requirement for diagnosis. Thus, in FIG. 8, every physiological parameter except for pH and D-dimer is trending into circular visually-annotated zone 860, suggesting that the patient may have, or may be trending towards having, a pulmonary embolism. Although not shown in FIG. 8, in some embodiments, portions of the comet-shaped graphical elements that are within circular visually-annotated zone 860 may be visually emphasized, e.g., in the reverse of FIG. 4A, because it may be important to call the attention of medical personnel to those physiological parameters that are trending in a negative direction.

Figure 9:
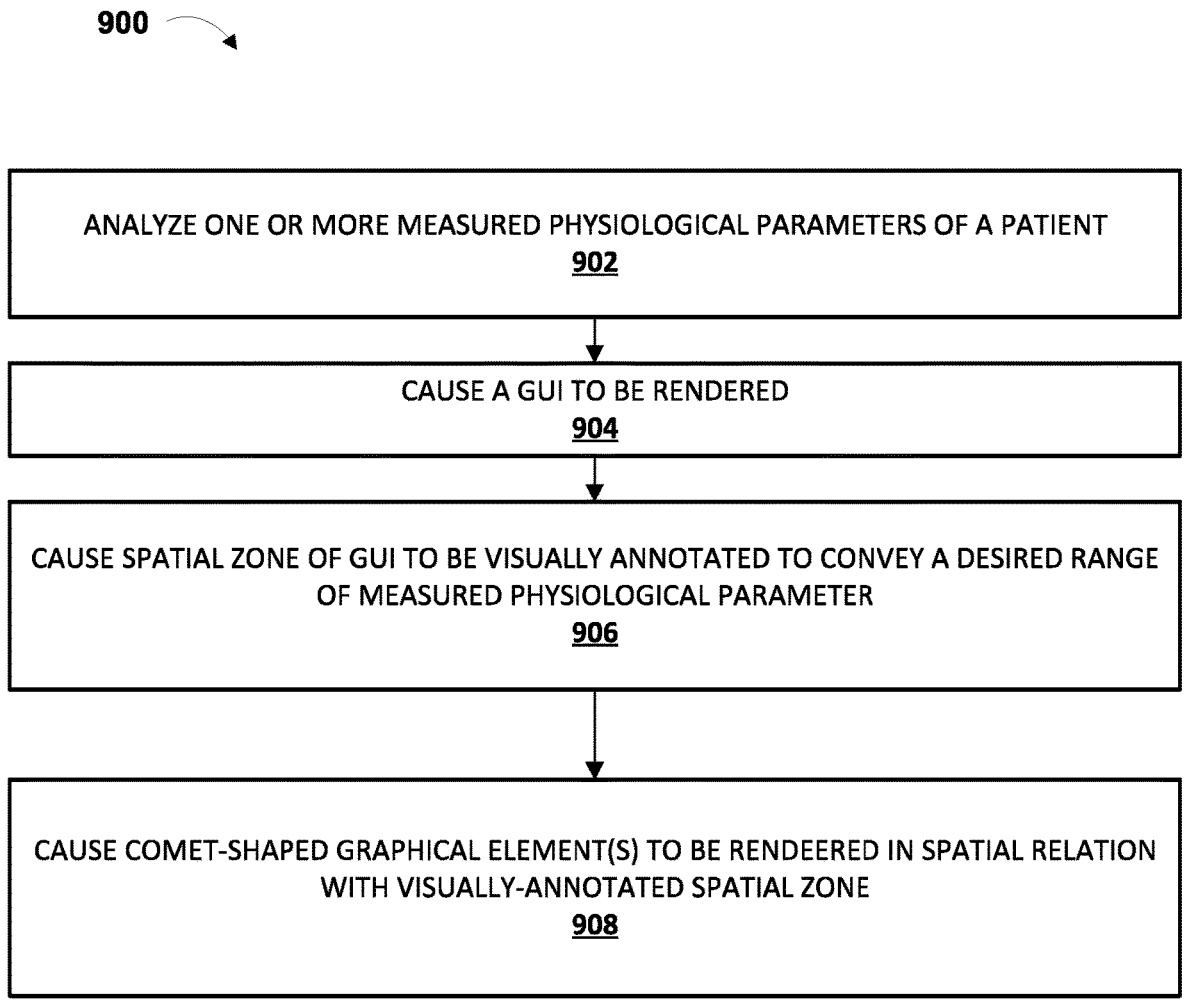
FIG. 9 depicts an example method for practicing selected aspects of the present disclosure.

Referring now to FIG. 9, an example method 900 of practicing selected aspects of the present disclosure is described. For convenience, the operations of the flowchart are described with reference to a system that performs the operations. This system may include various components of various computer systems. For instance, various operations may be performed by one or more components of UI engine 116 or other components of FIG. 1. Moreover, while operations of method 900 are shown in a particular order, this is not meant to be limiting. One or more operations may be reordered, omitted or added.

At block 902, the system may analyze one or more measured physiological parameters of a patient. This may include normalization of heterogeneous physiological parameters as demonstrated in FIGS. 3A and 3B. This may also include determining (e.g. computing) a rate of change in one or more of the measured physiological parameters over time as well as determining other pieces of information that shall be conveyed by the rendered graphical element(s). At block 904, the system may, based on the analyzing of block 902, causing a graphical user interface such as 212, 412, 512, 612, or 812 to be rendered. For example, UI engine 116 may transmit data (e.g., markup language, rasterized data, vector graphics data, graphics instructions, etc.) to a remote computing device that renders the GUI based on the data. Alternatively, a device such as patient monitor 104 may render a GUI itself based on physiological parameters it receives locally (e.g., measured from patient 100 in real time) and/or physiological parameters it obtains from information sources such as HIS 112 and/or EMR/PDSM 114.

In various implementations, the graphical user interface may include one or more comet-shaped graphical elements (e.g., 214, 414$_{1-8}$, 514$_{1-8}$, those depicted in FIGS. 6-8) that conveys a rate of change in one or more of the physiological parameters over time. In some implementations, each comet-shaped graphical element includes a tail (e.g., 216) that is sized or shaped to convey the rate of change. For example, the longer the tail, the greater the rate of change over time. A shorter tail may indicate a less dramatic rate of change. No tail may indicate no change.

At block 906, the system may cause a spatial zone of the GUI to be visually annotated to convey one or more desired ranges of one or more measured physiological parameters of the one or more measured physiological parameters. At block 908, the system may cause one or more comet-shaped graphical elements to be rendered in spatial relation with the visually-annotated zone of the GUI to convey how the given measured physiological parameter is trending relative to the desired range.

Figure 10:
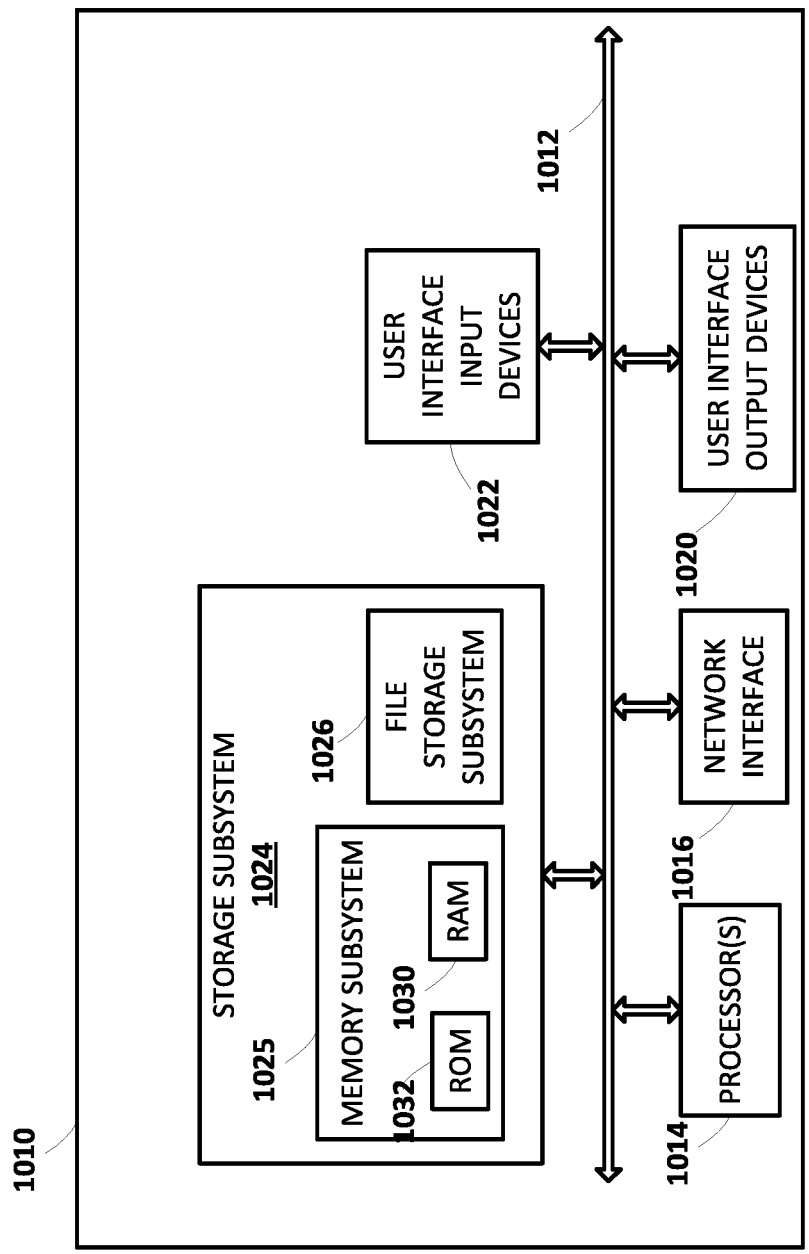
FIG. 10 depicts an example computing system architecture.

FIG. 10 is a block diagram of an example computing device 1010 that may optionally be utilized to perform one or more aspects of techniques described herein. Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the method of FIG. 9 and the normalization data processing demonstrated in FIGS. 3A-B, as well as to implement various components depicted in FIG. 1.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

According to the present disclosure easily recognizable visual patterns are generated and rendered that allow for quicker and more reliable diagnosis than laborious processes of putting together several numbers to create an equivalent mental picture. The present disclosure brings together multiple factors and assures that none of the available facts are missed. It thus makes things easier for a user, lowers the mental workload and creates a useful diagnostic tool.

Effects of a treatment of a patient are directly and immediately visible and easily understandable since any changes of any measured physiological parameter(s) in response to a certain treatment will be reflected so that the user (e.g. a caregiver or clinician) can immediately react in case of any problematic changes of a physiological parameter.

For instance, if a user recognizes that a certain operation of a machine used for treatment (e.g. of a ventilator) or a certain medication (e.g. given via an infusion) leads to a critical change of the patient's heart rate or oxygenation state, this will be immediately be reflected in the comet-shaped graphical element and can thus be quickly recognized and counteracted by the user, e.g. by changing a parameter of the operation of the machine or by changing the medication. Both, a quick diagnosis and an immediate treatment, i.e. a direct and fast interaction between diagnosis and treatment are thus possible with the present disclosure.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

According to another aspect a method and a corresponding system are presented, the method including:
  analyzing one or more measured physiological parameters of a patient; and
  based on the analyzing, causing a graphical user interface to be rendered, wherein the graphical user interface includes a comet-shaped graphical element that conveys a rate of change in one or more of the measured physiological parameters over time, wherein the comet-shaped graphical element includes a tail that is sized or shaped to convey the rate of change.

The invention claimed is:
1. A method implemented using one or more processors, comprising:

analyzing one or more measured physiological parameters of a patient, which includes determining a rate of change in one or more of the measured physiological parameters over time;

normalizing, using a first function, one or more of the measured physiological parameters to generate one or more normalized values, such that heterogeneous physiological parameters are standardized for intuitive comparison; and based on the analyzing and the normalizing, causing a graphical user interface to be rendered, wherein the graphical user interface includes a comet-shaped graphical element that conveys the rate of change in the one or more of the measured physiological parameters over time, wherein the comet-shaped graphical element includes a tail that is sized or shaped to convey the rate of change, wherein the comet-shaped graphical element is rendered according to the one or more normalized values.

2. The method of claim 1, wherein a spatial zone of the graphical user interface is visually annotated to convey a desired range of a given measured physiological parameter of the one or more measured physiological parameters, wherein the comet-shaped graphical element is rendered in spatial relation with the spatial zone of the graphical user interface to convey how the given measured physiological parameter is trending relative to the desired range.

3. The method of claim 1, wherein:

the analyzing comprises analyzing a plurality of measured physiological parameters of the patient; and the graphical user interface includes a plurality of comet-shaped graphical elements, each comet-shaped graphical element conveying a rate of change in a respective one of the measured plurality of physiological parameters of the patient.

4. The method of claim 3, wherein the plurality of comet-shaped graphical elements are oriented radially about a center point.

5. The method of claim 4, wherein the graphical user interface is rendered on:

a smart watch display; or a wearable patient monitoring device display.

6. The method of claim 4, wherein an annular spatial zone of the graphical user interface that at least partially encircles the center point is visually annotated to convey a normalized desired range of each measured physiological parameter of the plurality of measured physiological parameters, wherein each comet-shaped graphical element is rendered in spatial relation with the visually-annotated annular zone of the graphical user interface to convey how the corresponding measured physiological parameter is trending relative to the desired range.

7. The method of claim 4, wherein the plurality of comet-shaped graphical elements oriented radially about the center point comprise a first bullseye configuration of a plurality of bullseye configurations rendered as part of the graphical user interface, each bullseye configuration corresponding to a different patient.

8. The method of claim 1, wherein the physiological parameter comprises a first physiological parameter, the comet-shaped graphical element is operable to cause one or more additional comet-shaped graphical elements to be rendered as part of the graphical user interface, and each of the one or more additional comet-shaped graphical elements conveys a rate of change of a corresponding additional physiological parameter that contributes to the rate of change of the first physiological parameter.

9. The method of claim 1, wherein the first function comprises a three-points-fitted quadratic function that converts a linear progression of a scale of the measured physiological parameter into a standardized display scale, the three points comprising an optimal level, a limit of a normal range, and an extreme of a displayed range.

10. A system comprising one or more processors and memory storing instructions that, in response to execution of the instructions by the one or more processors, cause the one or more processors to:

analyze one or more measured physiological parameters of a patient, which includes determining a rate of change in one or more of the measured physiological parameters over time;

normalize, using a first function, one or more of the measured physiological parameters to generate one or more normalized values, such that heterogeneous physiological parameters are standardized for intuitive comparison; and based on the analysis and the normalization, cause a graphical user interface to be rendered, wherein the graphical user interface includes a comet-shaped graphical element that conveys the rate of change in the one or more of the measured physiological parameters over time, wherein the comet-shaped graphical element includes a tail that is sized or shaped to convey the rate of change, wherein the comet-shaped graphical element is rendered according to the one or more normalized values.

11. The system of claim 10, wherein a spatial zone of the graphical user interface is visually annotated to convey a desired range of a given measured physiological parameter of the one or more measured physiological parameters, wherein the comet-shaped graphical element is rendered in spatial relation with the spatial zone of the graphical user interface to convey how the given measured physiological parameter is trending relative to the desired range.

12. The system of claim 10, wherein:

the analysis comprises an analysis of a plurality of measured physiological parameters of the patient; and the graphical user interface includes a plurality of comet-shaped graphical elements, each comet-shaped graphical element conveying a rate of change in a respective one of the measured plurality of physiological parameters of the patient.

13. The system of claim 12, wherein the plurality of comet-shaped graphical elements are oriented radially about a center point.

14. The system of claim 13, wherein an annular spatial zone of the graphical user interface that at least partially encircles the center point is visually annotated to convey a normalized desired range of each measured physiological parameter of the plurality of measured physiological parameters, wherein each comet-shaped graphical element is rendered in spatial relation with the visually-annotated annular zone of the graphical user interface to convey how the corresponding measured physiological parameter is trending relative to the desired range.

15. The system of claim 10, wherein the physiological parameter comprises a first physiological parameter, the comet-shaped graphical element is operable to cause one or more additional comet-shaped graphical elements to be rendered as part of the graphical user interface, and each of the one or more additional comet-shaped graphical elements conveys a rate of change of a corresponding additional physiological parameter that contributes to the rate of change of the first physiological parameter.

16. At least one non-transitory computer-readable medium comprising instructions that, in response to execution of the instructions by one or more processors, cause the one or more processors to:

analyze one or more measured physiological parameters of a patient;

normalize, using a first function, one or more of the measured physiological parameters to generate one or more normalized values, such that heterogeneous physiological parameters are standardized for intuitive comparison; and based on the analysis and the normalization, cause a graphical user interface to be rendered, wherein the graphical user interface includes a comet-shaped graphical element that conveys a rate of change in one or more of the measured physiological parameters over time, wherein the comet-shaped graphical element includes a tail that is sized or shaped to convey the rate of change, wherein the comet-shaped graphical element is rendered according to the one or more normalized values.

* * * * *